April 27, 1937.    L. D. MANNES ET AL    2,078,398

PHOTOGRAPHIC MATERIAL HAVING ALDEHYDE SCREENING DYES

Filed March 15, 1935

Leopold D. Mannes &
Leopold Godowsky, Jr.,
Inventors

By Newton M. Perrins
R. Frank Smith
Attorneys

Patented Apr. 27, 1937

2,078,398

UNITED STATES PATENT OFFICE 2,078,398

PHOTOGRAPHIC MATERIAL HAVING ALDEHYDE SCREENING DYES

Leopold D. Mannes and Leopold Godowsky, Jr., Rochester, N. Y., assignors, by mesne assignments to Eastman Kodak Company, Jersey City, N. J., a corporation of New Jersey Application March 15, 1935, Serial No. 11,281

12 Claims. (Cl. 95—2)

This invention relates to screening dyes particularly useful with sensitive photographic elements.

It is known that the amount of light which reaches a sensitive photographic element may be reduced or restricted to light of a definite color by the use of screening layers coated over the sensitive element, for instance, as disclosed in the patent to M. W. Seymour, No. 1,921,545, granted August 8, 1933. Numerous screening dyes have been proposed, among which are Tartrazine, Naphthol yellow and Quinoline yellow. These dyes have the undesirable property of desensitizing cyanine sensitized emulsions and are therefore unsuitable for incorporation in emulsions which have been color-sensitized by cyanine dyes. Certain dyes hitherto used have the additional undesirable property of diffusing or wandering out of the layer in which they are incorporated. When it is desirable to coat a layer of sensitive emulsion or plain gelatin containing a dye adjacent to another layer which is to contain either a definite dye or no dye at all, it is essential that there be no wandering of the dye from layer to layer during or after coating; and when the layer in which the dye is incorporated is light-sensitive, it is further essential that the dye does not desensitize the emulsion. The difficulties have been especially noticeable in yellow dyes.

The principal object of the present invention is to provide screening dyes, particularly yellow dyes, which do not wander from the layer in which they are incorporated, and which do not desensitize light-sensitive photographic emulsions.

We attain this object by the substitution of an aldehyde group in the molecule of certain dyes which are ordinarily soluble and which wander from the gelatin layer in which they are incorporated. This application may be considered as relating to a specific embodiment of the invention generally claimed in the co-pending application Serial No. 11,280 filed March 15, 1935 of Burt H. Carroll and ourselves, although it is not limited to dyes of the class disclosed therein.

Figure 1:
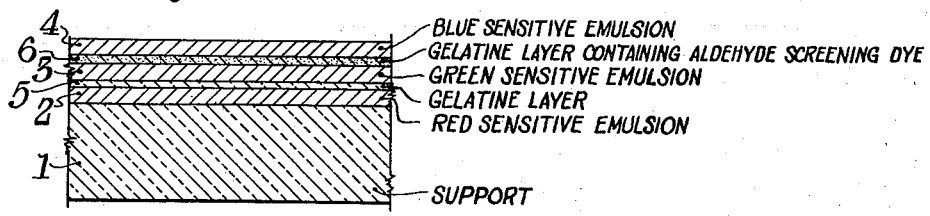
Figure 2:
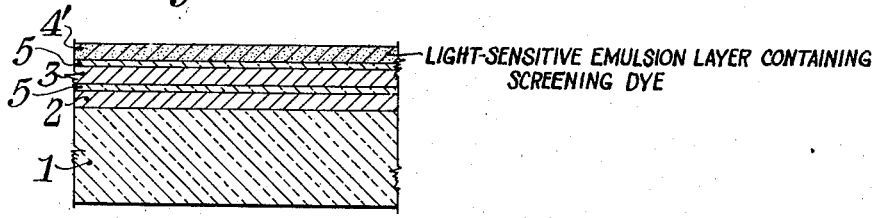
Figure 3:
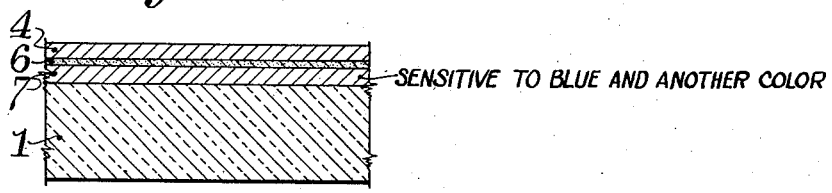

In the drawing, Fig. 1 is an enlarged section of a film carrying three color sensitive emulsions and having a screening dye, according to our invention, in a separate gelatin layer; Fig. 2 is an enlarged section view of a film in which the screening dye is incorporated in a sensitive emulsion layer; and Fig. 3 is a similar view of an element carrying only two sensitized layers.

In our application Serial No. 8,516 filed February 27, 1935 we have disclosed a process in which three light-sensitive emulsion layers are coated directly one on top of the other on a transparent base or support. In Fig. 1 of the accompanying drawing is shown a photographic element of this type in which 1 is a support which may be of transparent material such as a cellulose acetate or other plastic composition, glass or paper. On this support are coated gelatino-silver halide emulsion layers 2, 3 and 4, layer 2 being sensitive to red light, layer 3 being sensitive to green light and layer 4 being sensitive to blue light. Each of these layers is unavoidably sensitive to blue light; consequently, when the film is used to record light of red, green and blue colors in the respective emulsion layers, some means must be used to prevent blue light from reaching the layers 2 and 3. For this reason, a yellow dye is incorporated in a layer above or outer with respect to the sensitive layers 2 and 3.

As shown in Fig. 1, the dye is incorporated in an unsensitized gelatin layer 6 which is located between the sensitive layers 3 and 4. 5 is a plain uncolored and unsensitized gelatin layer which is used to separate layers 2 and 3 but which may be omitted. Fig. 2 shows a similar type of film in which the sensitive emulsion layers, 2, 3 and 4' are coated directly one on the other, 4' containing the screening dye incorporated directly in the light-sensitive emulsion. In Fig. 3, the support 1, blue sensitive layer 4 and screening layer 6 are the same as in Fig. 1, but only a single layer 7 is behind the screening layer, and this layer 7 may be green or blue sensitive or panchromatic.

We have found that screening or filter dyes for this purpose may be formed by substituting an aldehyde group in the molecule of various dyes and particularly in azo dyes. This appears to cause a combination between the dye and the gelatin to take place particularly under alkaline conditions, when the dye is incorporated in the gelatin layer, and therefore eliminates or greatly reduces the tendency of the dye to wander out of the gelatin layer.

Dyes which are suitable for this purpose are aldehyde substitution products of benzene- and naphthalene-azo-phenol and their derivatives. Dyes of the azo class in which the aldehyde group may be substituted are benzene-azo-phenol, benzene-azo-resorcinol, benzene-azo-cresol and Diamond yellow G. Diamond yellow G is formed by coupling m-aminobenzoic acid and salicylic acid. Its Rowe Color Index number is 218. Azo dyes having a greater number of azo groups may also be used, but in general these dyes have a deeper shade and, while suitable for filter dyes, do not always give the proper screening effect to restrict the passage of blue light. The following specific dyes have been found suitable:

2-hydroxy 5-phenylazo benzaldehyde

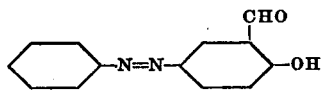

2:4-dihydroxy 5-phenylazo benzaldehyde

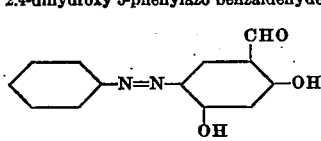

3:resorcylazo benzaldehyde

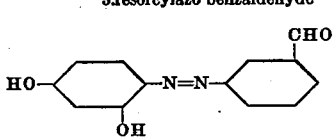

Other dyes, not of the azo class, which we may use, are the hydroxy benzaldehydes and naphthaldehydes, such as nitro or dinitro hydroxy benzaldehyde and nitro or dinitro hydroxy naphthaldehyde. The formula for nitro hydroxy benzaldehyde is—

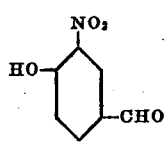

We may also use aldehyde dyes of the indophenol type, such as the dyes formed by coupling nitroso dialkylanilines with hydroxy benzaldehydes.

The dyes which we contemplate using are aldehyde dyes in which the aldehyde group is substituted in a benzene or naphthalene ring which may be substituted or unsubstituted. These dyes will be referred to as aldehyde dyes of the benzene series, it being understood that this term includes dyes in which the aldehyde radical is substituted in a benzene or naphthalene ring which may be otherwise substituted or unsubstituted and which may be part of the molecule of an azo dye.

It is most convenient to use these dyes in the salt form by dissolving them in a slightly alkaline solution of sodium hydroxide. For example when using 2-hydroxy 5-phenylazo benzaldehyde, one gram of dye is dissolved in five cc. of water and 5 cc. of acetone containing 5 cc. of a 10% solution of sodium hydroxide. This solution may be mixed directly with a sensitive emulsion or plain gelatin. Another suitable method which may be used instead of direct addition of the dye solution to the emulsion is to heat the dye with a gelatin solution made slightly alkaline. The concentrated gelatin solution thus formed is then chilled and washed, afterward diluted with plain gelatin or mixed with a sensitive emulsion for coating on the film support. Such a concentrated gelatin-dye solution may be made in the following manner:—

A gelatin solution containing the dye is made up containing the following:

| | | |
|---|---|---|
| Gelatin | g | 10 |
| Dye (2-hydroxy 5-phenylazo benzaldehyde) | g | 1 |
| Water | cc | 5 |
| Acetone | cc | 5 |
| Sodium hydroxide (10% solution) | cc | 5 |
| Water to | cc | 100 |

This gelatin solution is set, shredded, and washed, and the water drained off. When coated as a plain layer, this solution is mixed with water in equal volume, or a solution made so that the gelatin is present in the amount of about 5%. When added to a sensitive emulsion, an amount may be used to give a dye strength corresponding to that in the plain gelatin or more or less may be used as desired.

These aldehyde dyes may be decolorized and removed from the gelatin by acid oxidizing baths. In the process of our application above referred to, the sensitive emulsion layers are colored with a dye and the dye in the outer layer is decolorized and removed prior to recoloring these layers with another color. The decolorizing baths used for this purpose are an acid-permanganate or a quinone-alcohol bleach bath. Such a bath decolorizes and removes the aldehyde screening dye from the gelatin layer along with the dye to be decolorized. A bath suitable for this purpose is the following:

| | | |
|---|---|---|
| Quinone | g | 5 |
| Hydrochloric acid (Conc.) | cc | 20 |
| Iso-propyl alcohol | cc | 1000 |
| Water | cc | 75 |

It is understood that we are not limited to dyes used for screening or overcoating layers or to dyes coated over, or directly in, a light-sensitive layer. They may be used as subcoatings or undercoatings for the same purpose and may serve either as a filter layer or as a non-halation backing on the rear face or support side of a photographic element. Coatings made according to our invention are particularly useful where it is important that the dye will not diffuse into another layer with which it is in contact, as in the case where two films are rolled together face to face and exposed together in the camera. Our invention is applicable to any use in which a dye is to be employed which does not diffuse into an adjacent layer. We consider as included within our invention all modifications and equivalents coming within the scope of the appended claims.

What we claim is:

1. A photographic element comprising a support, at least one light-sensitive emulsion layer on the support, and a screening layer containing a non-wandering aldehyde azo dye of the benzene series over the light-sensitive emulsion layer.

2. A photographic element comprising a support, at least one light-sensitive gelatino silver halide emulsion layer on the support, and a screening layer containing a non-wandering aldehyde azo-benzene dye over the light-sensitive emulsion layer.

3. A photographic element comprising a support, at least two emulsion layers sensitive to light in different regions of the spectrum on one side of the support, and a screening layer containing a non-wandering aldehyde azo dye of the benzene series over one of the sensitive emulsion layers.

4. A photographic element comprising a support, three gelatino silver halide emulsion layers sensitive to light in different regions of the spectrum coated one on top of the other on one side of the support, and a non-wandering aldehyde azo of the benzene series screening dye in a layer over the two sensitive layers nearest the support.

5. A light-sensitive cyanine-sensitized gelatino-silver halide photographic emulsion having incorporated therein an aldehyde azo dye of the benzene series.

6. A light-sensitive cyanine-sensitized gelatino-silver halide photographic emulsion having incorporated therein an aldehyde azo-benzene dye.

7. A light-sensitive cyanine-sensitized gelatino-silver halide photographic emulsion having incorporated therein 2:4-dihydroxy 5-phenylazo benzaldehyde.

8. A photographic element comprising a support, at least two superposed gelatino-silver halide emulsion layers sensitive to light in different regions of the spectrum on one side of the support, at least one of said layers containing a cyanine dye and an aldehyde dye of the benzene series uniformly distributed in the sensitive emulsion layer containing the cyanine dye.

9. A photographic element comprising a support, three superposed gelatino-silver halide emulsion layers sensitive to light in different regions of the spectrum on one side of the support, at least one of said layers containing a cyanine dye and an aldehyde dye of the benzene series uniformly distributed in one of the sensitive emulsion layers not adjacent the support and containing the cyanine dye.

10. A photographic element comprising a support, at least two superposed gelatino-silver halide emulsion layers sensitive to light in different regions of the spectrum on one side of the support, unsensitized gelatin layers between the sensitive emulsion layers, and a non-wandering aldehyde dye of the benzene series uniformly distributed in one of the unsensitized gelatin layers.

11. A photographic element comprising a support, three superposed gelatino-silver halide emulsion layers sensitive to light in different regions of the spectrum on one side of the support, unsensitized gelatin layers between the sensitive emulsion layers, and a none-wandering aldehyde dye of the benzene series uniformly distributed in the unsensitized gelatin layer farthest from the support.

12. A photographic element comprising a support, three superposed gelatino-silver halide emulsion layers sensitive to light in different regions of the spectrum on one side of the support, unsensitized gelatin layers between the sensitive emulsion layers, and a non-wandering aldehyde azo-benzene dye uniformly distributed in the unsensitized gelatin layer farthest from the support.

LEOPOLD D. MANNES.
LEOPOLD GODOWSKY, JR.

CERTIFICATE OF CORRECTION.

Patent No. 2,078,398.                                                April 27, 1937.

LEOPOLD D. MANNES, ET AL.

It is hereby certified that error appears in the printed specification of the above numbered patent requiring correction as follows: Page 3, first column, line 5, claim 4, strike out the words "screening dye" and insert the same after "azo", same line and claim; and second column, line 17, claim 11, for "none" read non; and that the said Letters Patent should be read with these corrections therein that the same may conform to the record of the case in the Patent Office.

Signed and sealed this 6th day of July, A. D. 1937.

(Seal)

Henry Van Arsdale
Acting Commissioner of Patents.